United States Patent
Monnier

(10) Patent No.: US 11,500,996 B2
(45) Date of Patent: Nov. 15, 2022

(54) SECURING BOOT CONTROLLER FOR AN EMBEDDED SYSTEM, ASSOCIATED EMBEDDED SYSTEM AND SECURING BOOT METHOD

(71) Applicant: THALES, Courbevoie (FR)

(72) Inventor: Stéphane Monnier, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/306,353

(22) Filed: May 3, 2021

(65) Prior Publication Data

US 2021/0350003 A1 Nov. 11, 2021

(30) Foreign Application Priority Data

May 5, 2020 (FR) .................................... 20 04434

(51) Int. Cl.
*G06F 21/75* (2013.01)
*G06F 21/57* (2013.01)

(52) U.S. Cl.
CPC ...... *G06F 21/575* (2013.01); *G06F 2221/034* (2013.01)

(58) Field of Classification Search
CPC .......................... G06F 21/575; G06F 2221/034
See application file for complete search history.

(56) References Cited

U.S. PATENT DOCUMENTS

| | | | | |
|---|---|---|---|---|
| 8,176,305 B2* | 5/2012 | Yamaji | ................... | G06F 9/4418 713/1 |
| 10,733,288 B2* | 8/2020 | Jeansonne | ............. | G06F 21/575 |
| 2005/0091522 A1 | 4/2005 | Hearn et al. | | |
| 2006/0242398 A1* | 10/2006 | Fontijn | ................. | G06F 9/4406 713/2 |
| 2012/0117364 A1* | 5/2012 | Rosenquist | ........... | G06F 1/3203 713/300 |
| 2016/0300064 A1 | 10/2016 | Stewart et al. | | |
| 2018/0180444 A1* | 6/2018 | Cantaloube | .......... | G08G 5/0021 |
| 2019/0042765 A1* | 2/2019 | Chung | ................. | G06F 21/602 |

FOREIGN PATENT DOCUMENTS

EP 3895939 A1 * 10/2021 ........... G06F 21/575

OTHER PUBLICATIONS

French Search Report, from the French Patent Office in counterpart French Application No. 2004434 dated Nov. 17, 2020.

* cited by examiner

*Primary Examiner* — Zahid Choudhury
(74) *Attorney, Agent, or Firm* — ArentFox Schiff LLP

(57) ABSTRACT

The present invention relates to a securing boot controller for an embedded system, the embedded system further comprising an operational module incorporating an operational function of the system, and a verification module incorporating a function of verifying various components of the system;

The controller is configured to:
  upon cold startup of the system, make the verification function executable at boot up to perform a functional verification including a verification of the authenticity and integrity of the operational function;
  upon successful completion of the functional verification, at each warm start following said cold start of the system, making the operational function executable at boot up.

9 Claims, 1 Drawing Sheet

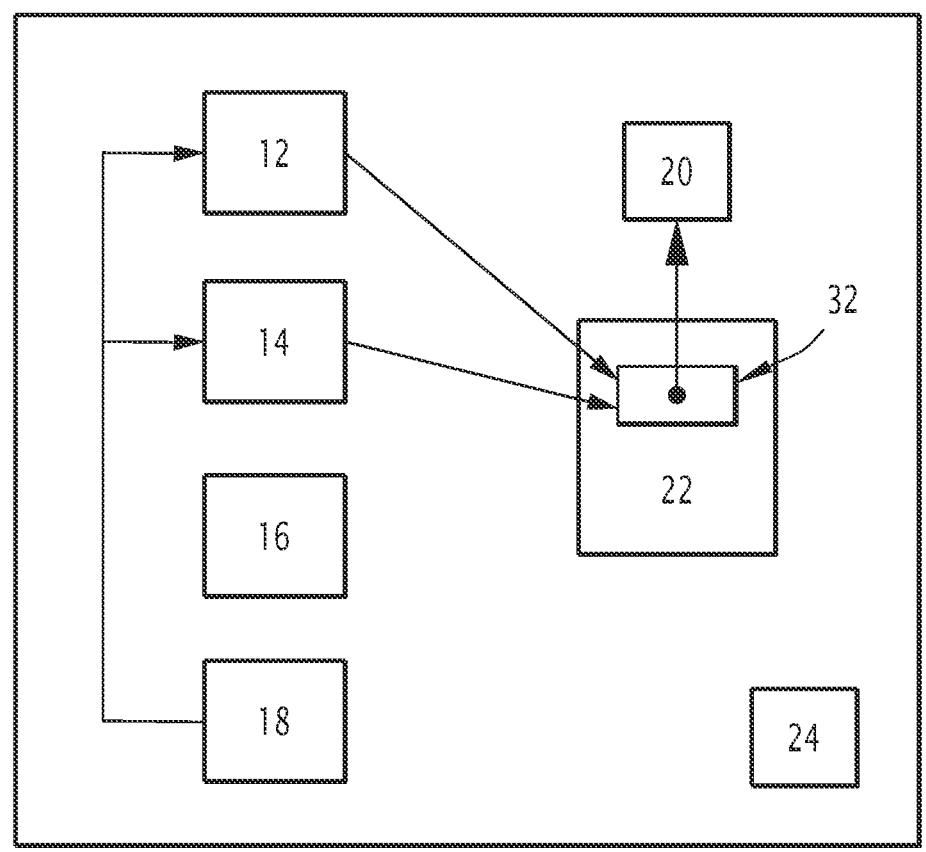

SECURING BOOT CONTROLLER FOR AN EMBEDDED SYSTEM, ASSOCIATED EMBEDDED SYSTEM AND SECURING BOOT METHOD

CROSS-REFERENCE TO RELATED APPLICATIONS

This application claims priority to French Application No. 20 04434, filed on May 5, 2020. The disclosure of the priority application is incorporated in its entirety herein by reference.

FIELD OF THE INVENTION

The present invention relates to a securing boot controller.

The present invention also relates to an embedded system and a securing boot method, associated with this securing boot controller.

The embedded system according to the invention is an avionics system in particular.

BACKGROUND OF THE INVENTION

In the field of embedded systems and in the field of avionics systems in particular, cyber security is becoming one of the key elements of the architecture. In order to respond to numerous threat scenarios, current embedded systems must be able to guarantee the authenticity and integrity of all its components.

Mechanisms for verifying the signatures of these components at system startup make it possible to address this issue.

However, in order to be able to integrate secure boot mechanisms for embedded systems, it is generally necessary to modify existing architectures. Indeed, in order to ensure a secure boot, it is necessary to intervene at the first steps of the embedded system startup, thus imposing a restart of the low-level software components in order to launch the signature verification mechanisms.

This restart is even more troublesome when the low-level components have COTS components ("commercial off-the-shelf components").

According to the methods of the state of the art, mechanisms exist to ensure a secure boot, such as certificates or chains of trust.

In particular, according to latter, upon boot up of an embedded system, a hardware component verifies and launches a boot software that verifies and launches an operating system that, in turn, verifies and launches applications hosted by this operating system.

However, in both cases, the impact on the existing architecture of the embedded system is non-negligible and generally requires a restart of at least several components of the embedded system.

In particular, existing mechanisms do not allow for integrating a securing boot mechanism to a component of an embedded system, without modifying at least some other components of this system.

However, such a modification of the other system components may imply the need to recertify them, which represents a very complex and costly process. This is particularly the case when these components have a high DAL (Development Assurance Level) criticality, such as DAL level A.

SUMMARY OF THE INVENTION

The object of the present invention is to provide a securing boot controller that enables the implementation of a securing boot mechanism for any component of an embedded system, without modifying the other system components and possibly, without the need for recertification of these other components.

To this end, the object of the invention is a secure controller for an embedded system, the embedded system further comprising an operational module integrating an operational function of the system, and a verification module integrating a verification function of different components of the system.

The controller is configured at a cold start of the system, to make the verification function executable upon boot up, to perform an operational verification including a verification of the authenticity and integrity of the operational function; and, upon successful completion of the operational verification, at each hot start following said cold start of the system, make the operational function executable upon boot up.

According to further features of the invention, the controller comprises one or more of the following features, considered alone or according to all technically possible combinations:

- configured to make a function executable upon boot up by placing that function or a reference to it in a reserved system boot sector;
- the cold start corresponds to a reboot of the system after a power cut leading to a loss of at least part of the data contained in a random-access memory of the system;
- to consult the status of a boot register modifiable by a power supply controller of the embedded system to determine the boot type chosen, between a hot start and a cold start;
- being in the form of a hardware component, preferably in the form of an FPGA component;
- implemented according to the same criticality level as the verification module, this criticality level being greater than or equal to the criticality level of the operational module;
- at the cold start of the system, associating a memory address with the operational function, accessible by the verification function;
- the embedded system further comprises a configuration module; said operational verification further comprising a verification of the authenticity and integrity of the configuration module.

The invention also relates to an embedded system comprising:

- an operational module integrating an operational function of the system;
- a verification module integrating a verification function of different components of the system; and
- a securing boot controller as previously described.

The invention also has as its object a securing boot method for the embedded system as previously described.

The method comprises the following step:

- upon a cold start of the embedded system, making verification function executable at boot up, to perform a functional verification including a verification of the authenticity and integrity of the operational function; or
- upon successful completion of the operational verification, at each warm start following said cold start of the system, making the operational function executable at boot up.

BRIEF DESCRIPTION OF THE DRAWING

These features and advantages of the invention will become apparent from the following description, given only as a non-limiting example, made with reference to the single FIGURE, also referred to as FIG. 1 [FIG. 1], in which an embedded system according to the invention has been schematically illustrated.

DETAILED DESCRIPTION OF THE INVENTION

In particular, in this FIGURE, the embedded system is designated by reference 10 and shows an avionics system in particular.

In a particular example of the invention, this avionics system shows a switch of an avionics network. According to other examples of the invention, this avionics system shows any other aircraft system.

Advantageously, the embedded system 10 is a critical system of a determined DAL (Development Assurance Level).

As shown in the FIGURE, the embedded system 10 comprises an operational module 12, a verification module 14, a configuration module 16 and a boot controller 18.

The embedded system 10 also comprises hardware resources for implementing the operation of its various components 12 through 18.

These hardware resources are known per se and comprise, but are not limited to, a processor 20, a storage space 22, and a random-access memory 24.

In particular, the storage space 22 has, for example, a FLASH type memory allowing different functions executable by the processor 20 to be stored at different addresses. These functions thus have software.

In particular, the storage space 22 defines a boot sector 32 defining a function to be executed by the processor 20 at the boot up of the system 10. This function is thus executable at boot up, according to the terminology used in the following.

In particular, this boot sector 32 has a predefined memory address to which the processor 20 refers upon boot up of the system 10.

The boot sector 32 thus contains a function executable at boot up by the processor 20, or at least a reference to a memory address storing this function, when it takes the form of software. When the function, executable at boot up, is implemented at least partially in the form of a hardware component, the boot sector 32 thus contains a reference to that component.

The random-access memory 24 is also known per se and, in particular, has an exchange buffer between the various components of the embedded system 10.

As is also known per se, the random-access memory 24 can store exchange data, at least temporally, when the embedded system 10 is powered.

In some example embodiments, the random-access memory 24 can also store exchange data during so-called short power outages during which it is, for example, powered by an internal component of the embedded system 10 having an energy reserve. Such a component makes it possible, for example, to make the embedded system 10 unaffected by this type of disturbance.

The operational module 12 integrates an operational function of the embedded system 10.

This operational function is implemented by the embedded system 10 and in particular by the processor 20. In the described example, this operational function is, for example, in the form of software which is then stored, for example, in the storage space 22.

In the example embodiment where the embedded system 10 has an avionics network switch, the operational function provided by the operational module 12 has maintenance data transmissions, for example.

The configuration module 16 is used to define operating parameters for the system 10.

Thus, for example, this configuration module 16 defines a plurality of operating parameters of at least some of the components of the system 10.

In the example embodiment where the embedded system 10 has a switch, the configuration module 16 has a configuration table in particular, defining the data path between different input and output ports of this switch.

Advantageously, according to the invention, this configuration module 16 is in the form of a non-volatile memory such as a FLASH type memory.

The verification module 14 integrates a function for verifying various components of the embedded system 10.

In particular, this verification function verifies the authenticity and integrity of each of these components, according to methods known per se, for example.

In particular, in the described example embodiment, the verification function makes it possible to verify the authenticity and integrity of the configuration module 16, and in particular of the configuration table in the case of the switch, as well as the authenticity and integrity of the operational module 12, by analyzing the signatures of the latter, for example, with SHA (Secure Hash Algorithm) or RSA (named after its authors, Ronald Rivest, Adi Shamir and Leonard Adleman) cryptographic algorithm types, or others.

Advantageously, according to the invention, the verification module 14 enables its verification function to be implemented with respect to each of the components of the embedded system 10 at the startup of this system, as will be explained in detail later.

The verification module 14 is in the form of a hardware component, for example, such as an FPGA (Field Programmable Array) component, or in the form of software.

In the latter case, the verification function integrated in the verification module 14 is stored in the storage space 22, for example.

The securing boot controller 18 according to the invention enables a securing boot of the system 10 to be implemented as will be explained in detail later with reference to the boot method according to the invention.

In particular, to this end, the controller 18 enables determination of the system boot type during each boot up of the embedded system 10. In particular, the controller 18 enables determination of whether it is a cold start or a hot start of the system 10.

In particular, in all that follows, cold start or initial boot means a boot up after at least a partial loss of exchange data from the random-access memory 24. This boot up occurs in particular following a prolonged power failure or following a shutdown of the system 10. A cold start is also performed during any initial system boot, that is, during the first boot up of the system after its assembly and/or installation.

In contrast to a cold start, a hot start is defined as a boot up of the system 10 following a short power failure. Generally, during such a hot start of the system, the data in the random-access memory 24 is not lost.

To determine the boot type, the controller 18 is adapted to consult the status of a startup register, for example, modifiable by a power controller. In particular, depending on the duration of the power failure, for example, this power controller is adapted to change the status of this register to a particular value.

The controller 18 also enables changing the boot sector 32 based on the determined boot type, as will be explained later.

The controller 18 is in the form of a hardware component, for example, particularly in the form of an FPGA component.

Advantageously according to the invention, its criticality level DAL is equivalent to that of the verification module 14 and is higher than the criticality level of the operational module 12. For example, the controller 18 and the verification module 14 may have the criticality level DAL A while the operational module 12 may have a lower criticality level (DAL B or DAL C or even DAL D or DAL E) or equal to the criticality level DAL A. The method for securely starting the embedded system 10 according to the invention will now be explained.

Initially, the system 10 is considered about to be started.

Thus, first, the method comprises an initial step in which the controller 18 determines the boot type.

When the controller 18 determines that it is a cold start, in a subsequent step, the controller 18 makes the verification function executable at boot, to perform a verification of the authenticity and integrity of the operational function as well as the configuration module 16.

In particular, to make the verification function executable, the controller 18 places the verification function or alternatively a reference to it in the boot sector 32.

Further, to make the operational function visible to the verification function, the controller 18 associates a memory address in the storage area 22 with the operational function.

Next, the controller 18 retrieves a result of verification performed by the verification function.

When the controller 18 determines that it is a hot start in the initial step, this controller 18 first checks, in a subsequent step, the verification result provided by the verification function during the cold start.

When this result is positive, that is, when the verification is successful, in a next step, the controller 18 makes the operational function integrated in the operational module 12 executable at boot up.

To do this, as in the previous case, the controller 18 places the verification function or alternatively a reference to it in the boot sector 22, thus replacing the verification function or a reference to it in this sector.

In this case, the embedded system 10 is then started without execution of the verification function.

It can thus be seen that the present invention has a number of advantages.

First, it is clear that the controller according to the invention enables manage the management at boot up of different system components, depending on the boot type.

Thus, during a cold start, the controller makes the verification function executable, which then verifies the other components of the embedded system and in particular the operational function and the configuration module.

In the case of one of the following hot starts, the controller according to the invention makes the operational function executable without executing the verification function. This then allows a securing boot mechanism to be integrated into an embedded system without modifying other components of that system.

Indeed, since the operational function and the verification function are executed independently of each other at system boot, the operational function does not need to integrate a specific secure boot mechanism. This security is provided by the verification function during the cold start of the system.

This avoids the need for recertification of the unmodified components of the embedded system, which is particularly advantageous when the system is of a high criticality level, such as DAL level A. Thus, the invention makes it possible to considerably reduce the cost and complexity of the process of integrating a new component into such an embedded system.

The invention claimed is:

1. A securing boot controller for an embedded system, the embedded system further comprising an operational module incorporating an operational function of the system, and a verification module incorporating a function of verifying various components of the system;
   the controller being configured to:
     upon cold start of the system, to make the verification function executable to perform a functional verification at boot up, including a verification of authenticity and integrity of the operational function;
     upon successful completion of the functional verification, at each warm start following said cold start of the system, to make the operational function executable at boot up; and
     consult a status of a startup register modifiable by a power controller of the embedded system to determine a boot type selected, between a hot start and the cold start,
   wherein the cold start corresponds to a reboot of the system after a power failure leading to a loss of at least a portion of data contained in a random-access memory of the system, and
   wherein, at each warm start following said cold start of the system, the embedded system is started without execution of the verification function.

2. The controller according to claim 1, configured to make a function executable at boot up by placing that function or a reference to it in a reserved boot sector of the system.

3. The controller according to claim 1, being in the form of a hardware component.

4. The controller according to claim 3, being in the form of an FPGA component.

5. The controller according to claim 1, implemented according to the same criticality level as the verification module, this criticality level being greater than or equal to the criticality level of the operational module.

6. The controller according to claim 1, further configured, upon cold start of the system to, associate with the operational function a memory address accessible by the verification function.

7. The controller according to claim 1, wherein the embedded system further comprises a configuration module;
   said operational verification further comprising a verification of the authenticity and integrity of the configuration module.

8. An embedded system comprising:
   an operational module integrating an operational function of the system;
   a verification module incorporating a function to verify various components of the system; and
   the securing boot controller according to claim 1.

9. A method for securely starting the embedded system according to claim 8;
   the method comprising the following step:
     upon a cold start of the embedded system, making the verification function executable at boot up, to perform an operational verification comprising a verification of the authenticity and integrity of the operational function; or
     upon successful completion of the functional verification, at each warm start following said cold start of the system, making the operational function executable at boot up without execution of the verification function.

\* \* \* \* \*